US007939151B2

(12) United States Patent
Kuhmann et al.

(10) Patent No.: US 7,939,151 B2
(45) Date of Patent: May 10, 2011

(54) COOLANT LINE

(75) Inventors: Karl Kuhmann, Duelmen (DE); Rainer Goering, Borken (DE); Roland Wursche, Duelmen (DE); Juergen Franosch, Marl (DE); Hans Ries, Marl (DE); Clemens Jacobs, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 173 days.

(21) Appl. No.: 10/580,194

(22) PCT Filed: Jul. 21, 2005

(86) PCT No.: PCT/EP2005/053547
§ 371 (c)(1),
(2), (4) Date: May 23, 2006

(87) PCT Pub. No.: WO2006/010736
PCT Pub. Date: Feb. 2, 2006

(65) Prior Publication Data
US 2007/0148388 A1 Jun. 28, 2007

(30) Foreign Application Priority Data
Jul. 26, 2004 (DE) .................. 10 2004 036 179

(51) Int. Cl.
*F16L 11/04* (2006.01)
(52) U.S. Cl. .............. 428/36.91; 428/34.7; 428/35.7; 428/36.4; 428/36.6; 428/36.8
(58) Field of Classification Search ............ 428/34.1, 428/34.4, 34.6, 34.7, 35.7, 36.4, 36.6, 36.7, 428/36.8, 36.9, 36.91
See application file for complete search history.

(56) References Cited

U.S. PATENT DOCUMENTS

| 4,174,358 | A | * | 11/1979 | Epstein ................. 525/183 |
| 4,737,536 | A | * | 4/1988 | Kawase et al. ............. 524/451 |
| 5,310,584 | A | * | 5/1994 | Jacoby et al. ............... 428/2 |
| 5,313,987 | A | | 5/1994 | Roeber et al. |
| 5,404,915 | A | | 4/1995 | Muegge et al. |
| 5,500,263 | A | | 3/1996 | Roeber et al. |
| 5,512,342 | A | | 4/1996 | Roeber et al. |
| 5,554,426 | A | | 9/1996 | Roeber et al. |
| 5,706,864 | A | * | 1/1998 | Pfleger ................. 138/121 |
| 5,798,048 | A | | 8/1998 | Ries |
| 5,858,492 | A | * | 1/1999 | Roeber et al. .......... 428/36.91 |
| 6,090,459 | A | | 7/2000 | Jadamus et al. |
| 6,161,879 | A | | 12/2000 | Ries et al. |
| 6,254,949 | B1 | * | 7/2001 | Gluck et al. ............ 428/36.91 |
| 6,335,101 | B1 | | 1/2002 | Haeger et al. |
| 6,355,358 | B1 | | 3/2002 | Boeer et al. |
| 6,391,982 | B1 | | 5/2002 | Haeger et al. |
| 6,407,182 | B1 | | 6/2002 | Maul et al. |
| 6,428,866 | B1 | | 8/2002 | Jadamus et al. |
| 6,433,087 | B1 | * | 8/2002 | Ebner et al. ............... 525/191 |
| 6,451,395 | B1 | | 9/2002 | Ries et al. |
| 6,528,137 | B2 | | 3/2003 | Franosch et al. |
| 6,538,073 | B1 | | 3/2003 | Oenbrink et al. |
| 6,562,907 | B2 | * | 5/2003 | Johoji et al. ............... 525/191 |
| 6,579,581 | B2 | | 6/2003 | Bartz et al. |
| 6,660,796 | B2 | | 12/2003 | Schueler et al. |
| 6,677,015 | B2 | | 1/2004 | Himmelmann et al. |
| 6,680,093 | B1 | | 1/2004 | Ries et al. |
| 6,726,999 | B2 | | 4/2004 | Schueler et al. |
| 6,766,091 | B2 | | 7/2004 | Beuth et al. |
| 6,783,821 | B2 | | 8/2004 | Ries et al. |
| 6,793,997 | B2 | | 9/2004 | Schmitz |
| 6,794,048 | B2 | | 9/2004 | Schmitz et al. |
| 7,025,842 | B2 | | 4/2006 | Monsheimer et al. |
| 7,199,188 | B2 | * | 4/2007 | Chou ................... 525/179 |
| 7,232,597 | B2 | * | 6/2007 | Iwata et al. ............. 428/36.9 |
| 7,238,738 | B2 | * | 7/2007 | Dupuy et al. ............ 524/413 |
| 7,375,162 | B2 | * | 5/2008 | Strebel et al. ............. 525/240 |
| 2001/0018105 | A1 | | 8/2001 | Schmitz et al. |
| 2002/0142118 | A1 | | 10/2002 | Schmitz et al. |
| 2003/0072987 | A1 | | 4/2003 | Ries et al. |
| 2003/0124281 | A1 | | 7/2003 | Ries et al. |
| 2003/0212174 | A1 | | 11/2003 | Peirick et al. |
| 2004/0140668 | A1 | | 7/2004 | Monsheimer et al. |
| 2004/0202908 | A1 | | 10/2004 | Schmitz et al. |
| 2004/0265527 | A1 | | 12/2004 | Schmitz et al. |
| 2006/0078752 | A1 | | 4/2006 | Schmitz et al. |
| 2006/0083882 | A1 | | 4/2006 | Schmitz et al. |
| 2006/0099478 | A1 | | 5/2006 | Schmitz et al. |
| 2006/0100323 | A1 | | 5/2006 | Schmidt et al. |
| 2006/0141188 | A1 | | 6/2006 | Schmitz et al. |
| 2007/0148388 | A1 | | 6/2007 | Kuhmann et al. |

FOREIGN PATENT DOCUMENTS

| DE | 37 15 251 | 12/1988 |
| DE | 44 28 236 | 11/1995 |
| DE | 102 04 395 | 9/2003 |
| EP | 0 436 923 | 7/1991 |
| EP | 0 659 534 | 6/1995 |
| EP | 0 659 535 | 6/1995 |
| EP | 0 671 582 | 9/1995 |
| EP | 0 754 898 | 1/1997 |
| EP | 1 216 823 | 6/2002 |
| EP | 1 362 890 | 11/2003 |
| JP | 10 001592 | 1/1998 |
| JP | 10 182874 | 7/1998 |
| JP | 03 568663 | 9/2004 |
| WO | 01 42005 | 6/2001 |
| WO | 01 42701 | 6/2001 |
| WO | 02/44604 | 6/2002 |
| WO | 2004/033545 | 4/2004 |

OTHER PUBLICATIONS

U.S. Appl. No. 08/609,612, filed Mar. 1, 1996, Jadamus, et al.

(Continued)

Primary Examiner — Walter B Aughenbaugh
(74) Attorney, Agent, or Firm — Oblon, Spivak, McClelland, Maier & Neustadt, L.L.P.

(57) ABSTRACT

A coolant line includes
an outer layer including a polyamide molding composition and
an inner layer including polypropylene and at least 0.02% by weight of a heat stabilizer.
The coolant line has a high thermal aging resistance and bursting strength.

9 Claims, No Drawings

OTHER PUBLICATIONS

U.S. Appl. No. 10/588,487, filed Aug. 4, 2006, Schmitz, et al.
U.S. Appl. No. 10/598,264, filed Aug. 14, 2006, Wursche, et al.
U.S. Appl. No. 11/586,526, filed Oct. 26, 2006, Wursche, et al.
U.S. Appl. No. 11/685,283, filed Mar. 13, 2007, Dowe, et al.
U.S. Appl. No. 11/816,595, filed Aug. 17, 2007, Haeger, et al.
U.S. Appl. No. 11/816,588, filed Aug. 17, 2007, Haeger, et al.
U.S. Appl. No. 11/816,556, filed Aug. 17, 2007, Wursche, et al.
U.S. Appl. No. 11/813,103, filed Jun. 29, 2007, Baumann, et al.

* cited by examiner

COOLANT LINE

The invention relates to a multilayer coolant line which comprises an outer layer comprising a polyamide molding composition and an inner layer comprising a stabilized polyolefin molding composition.

Coolant lines of motor vehicles have in recent years had to meet increasing requirements in respect of the long-term stability on internal contact with water/glycol and at high operating temperatures of the line system. The required good mechanical properties including the required bursting strength at elevated temperatures above 100° C. are provided by polyamides. Pure polyolefin lines display unsatisfactory bursting strength in this high temperature range; the resistance to fats and oils is likewise limited.

However, lines made only of polyamides do not have a satisfactory hydrolysis resistance; the mechanical strength is likewise reduced by the swelling behavior in cooling fluids.

For this reason, multilayer coolant lines having a polyolefin inner layer and a polyamide outer layer are known in the prior art. The inner layer acts as a water barrier and protects the outer polyamide layer from hydrolytic degradation.

In particular, the increasing engine or engine space temperatures resulting from the increasing power density require pipes which have, inter alia, the following properties:

high bursting strength at temperatures in the region of 130° C. and above;
satisfactory cold impact toughnesses even after hot aging, which can be confirmed by the water/glycol pumped circulation test above about 130° C. over a period of at least 1000 hours or high storage at elevated temperatures, e.g. 150° C.;
satisfactory adhesion between the layers even after long-term stressing;
economical production using the known coextrusion technique.

EP-A-0 436 923 describes partly corrugated multilayer coolant lines comprising a polyolefin inner layer and a polyamide outer layer which may, if appropriate, be joined to one another via a bonding layer.

EP-A-1 362 890 describes multilayer pressurized fluid lines having at least one soft TPE inner layer in combination with an outer layer based on polyamide.

EP-A-0 671 582 describes a cooling fluid line comprising a plurality of layers and having a corrugation geometry which is modified by ridges in the longitudinal direction to reduce longitudinal expansion.

DE-A-44 28 236 describes a three-layer corrugated pipe as cooling water hose having an inner layer comprising a modified thermoplastic elastomer.

WO 01/42005 describes a cooling fluid line having an inner elastomeric layer and a polyamide outer layer.

WO 01/42701 describes a cooling fluid line having a layer comprising a blend of polyamide and polypropylene as bonding agent, a TPE inner layer and an outer polyamide layer.

DE-A-37 15 251 describes a two-layer pipe having a thin polyolefin inner layer.

However, the documents mentioned do not show a way in which the increased temperature resistance, the bursting strength at the operating temperatures mentioned and the long-term mechanical strength (in particular impact toughness) can be achieved.

The weak point of such pipes is the polyolefin inner layer. It has been found that polypropylene in particular becomes brittle relatively quickly under the operating conditions. A reason for this may be the oxygen dissolved in the cooling system or the oxygen which diffuses from the outside inward through the polymer layer; traces of metal present can act in the same direction. The problem becomes increasingly noticeable when the polyolefin inner layer is made thicker at the expense of the polyamide outer layer in order to make possible a satisfactory water barrier to protect the exterior polyamide layer. It has been found that a thickness of the polyolefin layer of at least about 0.3 mm, more preferably at least 0.4 mm, should be present to achieve this.

A consequence of the embrittlement of the inner layer is frequently that microcracks form and cooling fluid gets through these to the polyamide outer layer. The hydrolysis which then occurs leads to a considerable drop in the bursting strength and finally to failure of the pipe.

It was therefore an object of the invention to avoid these disadvantages and to provide a coolant line having high long-term stability.

This object was achieved by a coolant line which comprises the following layers:

I. an outer layer comprising a polyamide molding composition and
II. an inner layer comprising polypropylene and at least 0.02% by weight, preferably at least 0.1% by weight, particularly preferably at least 0.2% by weight, in particular at least 0.3% by weight and very particularly preferably at least 0.4% by weight, of a heat stabilizer.

In one possible embodiment, the material of the inner layer is adhesion-modified, e.g. by incorporation of acid anhydride groups. Suitable methods are prior art and corresponding products are commercially available. The material of the inner layer can also be present as a mixture of an unmodified polypropylene type with a modified propylene type.

In a second possible embodiment, the inner layer is made up of two sublayers of which the one adjacent to the polyamide layer is adhesion-modified and the other does not have to be adhesion-modified. Apart from the adhesion modification, different polypropylene molding compositions can be used here as layer materials.

In a further possible embodiment, a bonding layer having a different composition is located between the layers I. and II. In this regard, polyamide/polypropylene blends, for example, in which at least part of the polypropylene component is adhesion-modified are known from the prior art.

Polyamides which can be used are first and foremost aliphatic homopolycondensates and copolycondensates, for example PA 46, PA 66, PA 68, PA 610, PA 612, PA 410, PA 810, PA 1010, PA 412, PA 1012, PA 1212, PA 6, PA 7, PA 8, PA 9, PA 10, PA 11 and PA 12. (The designation of the polyamides corresponds to the international standard, with the first digit(s) indicating the number of carbon atoms in the starting diamine and the last digit(s) indicating the number of carbon atoms in the dicarboxylic acid. If only one number is given, this means that an α,ω-aminocarboxylic acid or the lactam derived therefrom has been used as starting material; otherwise, reference may be made to H. Dominighaus, Die Kunststoffe und ihre Eigenschaften, pages 272 ff., VDI-Verlag, 1976.)

The use of PA612 is particularly preferred since this polyamide firstly has a high bursting strength at high use temperatures and secondly has satisfactory dimensional stability in a humid atmosphere.

If copolyamides are used, these can comprise, for example, adipic acid, sebacic acid, suberic acid, isophthalic acid, terephthalic acid, naphthalene-2,6-dicarboxylic acid, etc., as coacid and bis(4-aminocyclohexyl)methane, trimethylhexamethylenediamine, hexamethylenediamine or the like as codiamine. Lactams such as caprolactam or laurolactam and aminocarboxylic acids such as 11-aminoundecanoic acid can likewise be incorporated as cocomponents.

The preparation of these polyamides is known (e.g. D. B. Jacobs, J. Zimmermann, Polymerization Processes, pp 424-467, Interscience Publishers, New York, 1977; DE-B 21 52 194).

Further suitable polyamides are mixed aliphatic/aromatic polycondensates as are described, for example, in the U.S. Pat. Nos. 2,071,250, 2,071,251, 2,130,523, 2,130,948, 2,241,322, 2,312,966, 2,512,606 and 3,393,210 and also in Kirk-Othmer, Encyclopedia of Chemical Technology, 3rd edition, vol. 18, pages 328 ff. and 435 ff., Wiley & Sons, 1982.

The polyamide molding composition can comprise either one of these polyamides or a plurality thereof as a mixture. Furthermore, up to 50% by weight of other thermoplastics can be present as long as these do not impair the bonding capability. Further thermoplastics which may be present are, in particular, rubbers which increase the impact toughness, e.g. ethylene-propylene or ethylene-propylene-diene copolymers, polyolefins (EP-0 731 308 A), polypentenylene, polyoctenylene, random or block copolymers of alkenylaromatic compounds with aliphatic olefins or dienes (EP-A-0 261 748) or core-shell rubbers having an elastic core of (meth)acrylate, butadiene or styrene-butadiene rubber having a glass transition temperature $T_g$ of $<-10°$ C., with the core being able to be crosslinked and the shell being able to be composed of styrene and/or methyl methacrylate and/or further unsaturated monomers (DE-A 21 44 528, 37 28 685).

The polyamide preferably has an excess of amino end groups, which generally results from a diamine being used as molecular weight regulator in the preparation. The excess of amino end groups can also be obtained by mixing a polyamide which is low in amino groups and a polyamide which is rich in amino groups. The ratio of amino end groups to carboxyl end groups should then be at least 51:49, preferably at least 55:45, particularly preferably at least 60:40 and in particular at least 70:30.

In addition, the polyamide molding composition can further comprise relatively small amounts of additives required for setting particular properties. Examples are pigments or fillers such as carbon black, titanium dioxide, zinc sulfide, silicates or carbonates, processing aids such as waxes, zinc stearate or calcium stearate, flame retardants such as magnesium hydroxide, aluminum hydroxide or melamine cyanurate, glass fibers, antioxidants, UV stabilizers and additives which give the product antielectrostatic properties or electrical conductivity, e.g. carbon fibers, graphite fibrils, stainless steel fibers or conductive carbon black.

In a specific embodiment, the molding composition contains from 1 to 25% by weight of plasticizer, particularly preferably from 2 to 20% by weight and in particular from 3 to 15% by weight.

Plasticizers and their use in polyamides are known. A general overview of plasticizers which are suitable for polyamides may be found in Gächter/Müller, Kunststoffadditive, C. Hanser Verlag, 2nd edition, p. 296.

Customary compounds suitable as plasticizers are, for example, esters of p-hydroxybenzoic acid having from 2 to 20 carbon atoms in the alcohol component or amides of arylsulfonic acids having from 2 to 12 carbon atoms in the amine component, preferably amides of benzenesulfonic acid.

Possible plasticizers are, for example, ethyl p-hydroxybenzoate, octyl p-hydroxybenzoate, i-hexadecyl p-hydroxybenzoate, N-n-octyltoluenesulfonamide, N-n-butylbenzenesulfonamide or N-2-ethylhexylbenzenesulfonamide.

The polypropylene molding composition of the inner layer can in principle comprise any commercial polypropylene type, for example isotactic or syndiotactic homopolypropylene, a random copolymer of propene with ethene and/or 1-butene, an ethylene-propylene block copolymer, a thermoplastic elastomer based on polypropylene and the like. The polypropylene can be prepared by any known method, for example by the Ziegler-Natta process or by means of metallocene catalysis. It can comprise an impact-modifying component such as EPM or EPDM rubber or SEBS. In addition, the customary auxiliaries and additives, for example pigments or fillers such as carbon black, titanium dioxide, zinc sulfate, silicates or carbonates or processing aids such as waxes, zinc stearate or calcium stearate, can be present. Customary proportions of polypropylene in the molding composition are, for example, at least 50% by weight, at least 60% by weight, at least 70% by weight, at least 80% by weight, or at least 90% by weight.

In a preferred embodiment, the polypropylene used in the innermost layer has a melt flow rate (MFR) in accordance with ISO 1133 (230° C./2.16 kg) in the range from 0.1 to 3 g/10 min, particularly preferably in the range from 0.15 to 2 g/10 min, in particular in the range from 0.18 to 1.5 g/10 min and very particularly preferably in the range from 0.2 to 1 g/10 min. Such a pipe has a particularly high aging resistance.

In a further preferred embodiment, the polypropylene of the innermost layer is a propene-ethene block copolymer, frequently also referred to as heterophase copolymer. Such heterophase copolymers can, for example, by prepared in a two-phase process carried out, for instance, as follows: firstly, a highly isotactic polypropylene is prepared, e.g. using a Ziegler-Natta catalyst, with a small amount of ethene sometimes being able to be present so as to give a random polymer. This material functions as matrix of a heterophase copolymer. In a second reaction step (if appropriate in another reactor), a second catalyst, e.g. a metallocene catalyst, is introduced if appropriate. A copolymerization of ethene with propene is now carried out, with this polymerization taking place in the voids of the first polymer. As a result, the second polymer is introduced there.

The block copolymer or heterophase copolymer contains, in a preferred embodiment, at least 0.5% by weight, at least 0.6% by weight, at least 0.7% by weight, at least 0.8% by weight or at least 0.9% by weight and not more than 20% by weight, not more than 15% by weight, not more than 12% by weight, not more than 10% by weight or not more than 8% by weight of ethene in copolymerized form. In addition, up to 15% by weight of 1-butene can be present in copolymerized form.

In a preferred embodiment, the molding composition of the inner layer or one of the inner sublayers contains from 0.1 to 50% by weight, preferably from 0.5 to 40% by weight and particularly preferably from 1 to 30% by weight, of a nano-size filler. Such fillers are, for example, modified sheet silicates. Their aspect ratio (the ratio of lateral dimensions and layer thickness) is generally at least 20, preferably at least 30 and particularly preferably at least 50, with the layer thickness being from 0.5 to 50 mm, preferably from 1 to 35 nm and particularly preferably from 1 to 20 nm. Polymeric nanocomposites comprising organophilized sheet silicates and polymers were described for the first time in the U.S. Pat. No. 2,531,396. The organophilization of sheet silicates is also known, for example, from the U.S. Pat. Nos. 2,531,472, 2,996,506, 4,105,578, 4,412,018, 4,434,075, 4,434,076, 4,450,095 and 4,874,728.

An overview of sheet silicates may be found in Lehrbuch der Anorganischen Chemie, Arnold F. Holleman, Niels Wiberg, 91st-100th edition, Verlag Walter de Gruyter, Berlin-New York, 1985, pages 764 to 786.

Organic modified sheet silicates are offered by various companies, for example by Südchemie AG (trade name: Nanofil), Southern Clay Products (trade name: Cloisite), Rheox GmbH (trade name: Bentone), Laporte (trade name: Laponite), COOP Chemical (trade name: Somasif) and TOP (trade name: Planomer).

Particularly suitable nanosize fillers are the sheet silicates montmorillonite, hectorite, saponite and also synthetic sheet silicates.

The heat stabilizer is, for example, a sterically hindered phenol or a sulfur compound, e.g. a dialkyl ester of thiopropionic acid or a thiodiethylene diester. Such compounds are commercially available; of course, mixtures of various heat stabilizers can also be used.

In addition, the polypropylene molding composition of the inner layer or one of the inner sublayers, preferably the innermost thereof, can further comprise a metal deactivator, for example in minimum amounts of from 0.01% by weight, 0.03% by weight, 0.06% by weight, 0.1% by weight or 0.15% by weight, with any metal deactivator customary for polyolefins being able to be used; for example, hydrazides can be employed.

The combination of metal deactivator, hindered phenol and thiosynergist, for example, is advantageous.

The polypropylene inner layer II. has, in the preferred case, a thickness of at least 0.3 mm and particularly preferably at least 0.4 mm. The total wall thickness of the pipe is preferably in the range from 0.8 to 2.5 mm, particularly preferably in the range from 0.9 to 2 mm and in particular in the range from 1 to 1.5 mm; the external diameter of the pipe is preferably in the range from 8 to 50 mm, particularly preferably in the range from 10 to 40 mm and in particular in the range from 12 to 30 mm.

The coolant line of the invention can be smooth or corrugated or corrugated only in subsections. It can be produced in one or more stages by injection molding, coextrusion, sequential coextrusion, coextrusion blow molding or sheathing processes. It is also possible to produce the line by means of the Conex process. This is a coextrusion in which the individual layers are applied on top of one another by means of a special extruder (conical rotors and stators) (WO 97/28949).

The coolant line of the invention can also be produced by means of special injection molding processes for producing multilayer hollow bodies. An example which may be mentioned is the combination of sandwich injection molding (production of a multilayer injection-molded part having a skin-core structure) and subsequent fluid injection (gas or water injection) to produce the hollow channel for the liquid in this injection-molding part.

Modified processes can in principle also be based on the half-shell technique, for instance in the processing of multilayer film/plate semifinished parts by thermoforming and welding of the halves to produce a molding having hollow spaces for conveying the liquid.

In a preferred embodiment, the corrugated pipe has a smooth inner layer. The outer layer is corrugated (if appropriate together with a bonding layer) and is joined to the inner layer in the valleys of the corrugations. This has the advantage that the resistance to flow is low, the wall thickness is uniform and, particularly compared to conventional corrugated pipes, there are no excessive local distortions caused by stretching; in addition, creases in which deposits can be formed are avoided in this way. Such pipes are described in WO 03/064910 and WO 03/064911.

The coolant line of the invention withstands, depending on the type of polyamide outer layer material, brief temperature peaks up to 150° C. that occur in the vicinity of an engine, and it has a high thermal aging resistance and good bursting strength. Owing to the inner polyolefin layer of the type claimed, the line is also resistant to the ethylene glycol/water mixtures used as cooling fluid at high temperatures up to about 135° C.

The invention is illustrated by way of example below.

In the examples, the following molding compositions were used:

Outer Layer (Layer I):
Polyamide 1: a heat-stabilized PA12
Polyamide 2: a heat-stabilized PA612
Inner Layer (Layer II):
Polypropylene 1: a heterophase copolymer based on propene and having an ethene content of 4.1% by weight (determined by means of $^{13}$C-NMR) and an MFR 230/2.16 in accordance with ISO 1133 of 2 cm$^3$/10 min.
Polypropylene 2: a heterophase copolymer based on propene and having an ethene content of 2.4% by weight (determined by means of $^{13}$C-NMR) and an MFR 230/2.16 in accordance with ISO 1133 of 0.4 cm$^3$/10 min.
Polypropylene 3: a compound composed of 99.2% by weight of polypropylene 2 and the following compounds:
  0.2% by weight of IRGANOX® MD 1024, a phenol-based metal deactivator,
  0.2% by weight of IRGANOX® 1010, a heat stabilizer based on a hindered phenol, and
  0.4% by weight of IRGANOX® PS802FL, a sulfur-based heat stabilizer.
Bonding layer: ADMER® QB520E, a polypropylene functionalized with maleic anhydride.

EXAMPLES 1 TO 5

Pipes having the dimension 8×1 mm were produced on a 5-layer unit equipped with two 45 mm extruders and three 30 mm extruders at an extrusion velocity of about 12 m/min.

| Example | Outer layer = layer I | Bonding layer | Layer II a | Layer II b | Layer II c |
|---|---|---|---|---|---|
| 1 | 0.45 mm of polyamide 1 | 0.1 mm | 0.15 mm of polypropylene 3 | 0.15 mm of polypropylene 3 | 0.15 mm of polypropylene 3 |
| 2 | 0.45 mm of polyamide 2 | 0.1 mm | 0.15 mm of polypropylene 3 | 0.15 mm of polypropylene 3 | 0.15 mm of polypropylene 3 |
| 3 *) | 0.45 mm of polyamide 1 | 0.1 mm | 0.15 mm of polypropylene 1 | 0.15 mm of polypropylene 1 | 0.15 mm of polypropylene 1 |
| 4 *) | 0.45 mm of polyamide 1 | 0.1 mm | 0.15 mm of polypropylene 2 | 0.15 mm of polypropylene 2 | 0.15 mm of polypropylene 2 |
| 5 | 0.70 mm of polyamide 1 | 0.1 mm | 0.05 mm of polypropylene 3 | 0.05 mm of polypropylene 3 | 0.10 mm of polypropylene 3 |

*) not according to the invention

Owing to the high viscosity of the polypropylene, the inner layer was in this case produced using 3 extruders.
Characterization of the Pipes:

In the pipes of examples 1 to 5, the adhesion between the bonding layer or polypropylene inner layer and the polyamide layer was so high that the composite could in some cases not be separated, but always gave high values above 3 N/mm, both when freshly extruded and after storage (internal contact storage with glycol/water at 130° C., 1300 h).

When an inner layer polypropylene which was not according to the invention was used (examples 3 and 4), the impact toughness after the internal contact storage was poorer than in examples 1 and 2 according to the invention.

In the case of example 5, which is not directly comparable with the other examples because of the thinner inner layer, the impact toughness after internal contact storage was poorer than in examples 1 and 2 according to the invention.

The invention claimed is:

1. A coolant line comprising:
   an outer layer comprising a polyamide molding composition; and
   an inner layer consisting of a polypropylene molding composition;
   wherein:
   the polyamide molding composition comprises PA612;
   the polypropylene molding composition comprises at least 50% by weight of polypropylene, at least 0.02% by weight of a heat stabilizer, and at least 0.01% by weight of a metal deactivator;
   the polypropylene is a propene-ethene block copolymer including 0.5 to 20% by weight of ethene in copolymerized form;
   the inner layer has a thickness of at least 0.3 mm; and
   the outer layer is the outermost layer of the coolant line.

2. The coolant line as claimed in claim 1, wherein the inner layer and the outer layer are joined by a bonding layer.

3. The coolant line as claimed in claim 1, wherein the inner layer is adhesion-modified.

4. The coolant line as claimed in claim 1, wherein the inner layer comprises two sublayers.

5. The coolant line as claimed in claim 1, wherein the heat stabilizer is a sterically hindered phenol or a sulfur compound.

6. The coolant line as claimed in claim 1, wherein the polypropylene molding composition comprises from 0.1 to 50% by weight of a nanosize filler.

7. The coolant line as claimed in claim 1, wherein the polypropylene has a melt flow rate (MFR) in accordance with ISO 1133 (230° C./2.16 kg) in a range of from 0.1 to 3 g/10 min.

8. The coolant line as claimed in claim 1, wherein the line is corrugated in subsections or in its entirety.

9. The coolant line as claimed in claim 8, wherein the line is configured as a corrugated pipe having a smooth inner layer.

* * * * *